United States Patent
Preinfalk

[15] 3,659,679
[45] May 2, 1972

[54] RUBBER TRACK BRAKE
[72] Inventor: Franz H. Preinfalk, Langenfeld, Germany
[73] Assignee: August Thyssen-Hutte AG, Duisburg-Hamborn, Germany
[22] Filed: Oct. 16, 1970
[21] Appl. No.: 81,233

[52] U.S. Cl..................................188/62, 238/150, 238/281
[51] Int. Cl..........................................................B61k 7/02
[58] Field of Search......................188/32, 62; 238/150, 281

[56] References Cited

UNITED STATES PATENTS 2,715,369  8/1955  Doehler................................188/62 X
3,439,778  4/1969  Garbers et al. ..........................188/62

Primary Examiner—Duane A. Reger
Attorney—Burgess, Dinklage & Sprung

[57] ABSTRACT

A rubber track brake for braking rolling rail vehicles such as freight cars and the like, having parallel rails of a rubber material laid in longitudinal section of track in place of the normal rails, guiding rails are disposed alone side the rubber rails and have a contact surface for the flanges of car wheels. The rubber rails are securely fixed to a foundation and the guiding rails are capable of being vertically displaced to engage and disengage the track brake of the invention.

2 Claims, 4 Drawing Figures

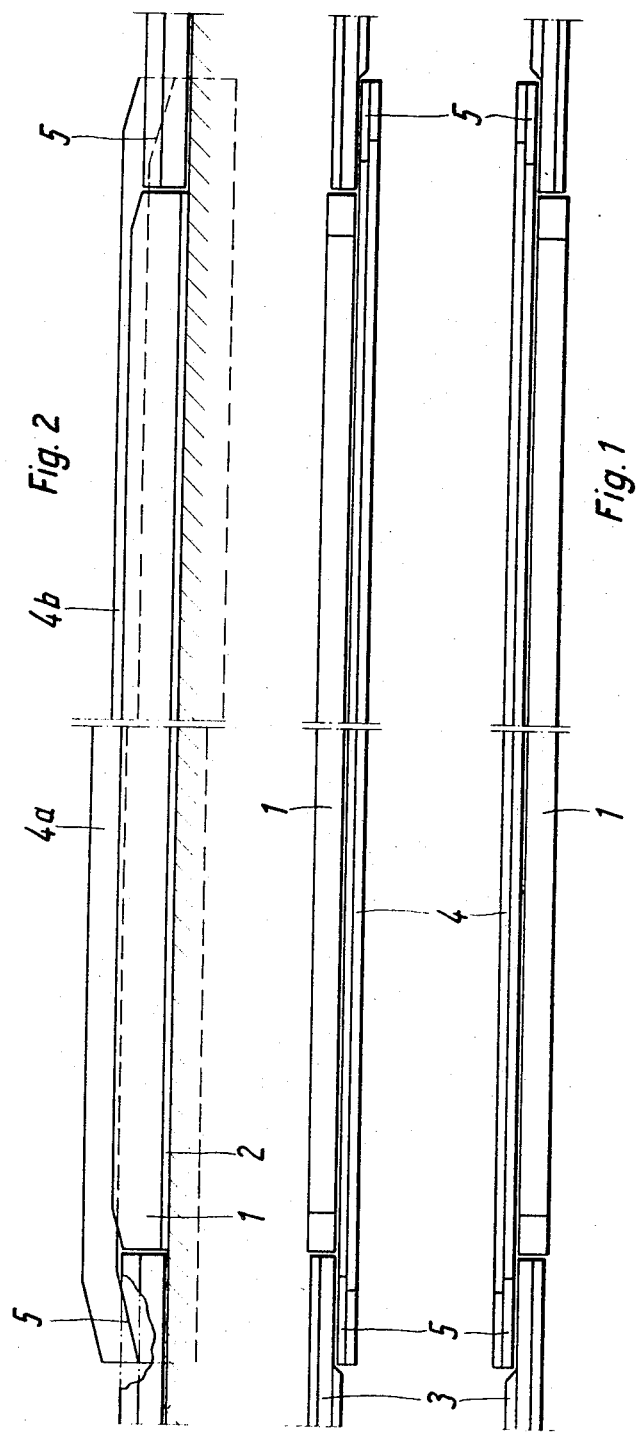

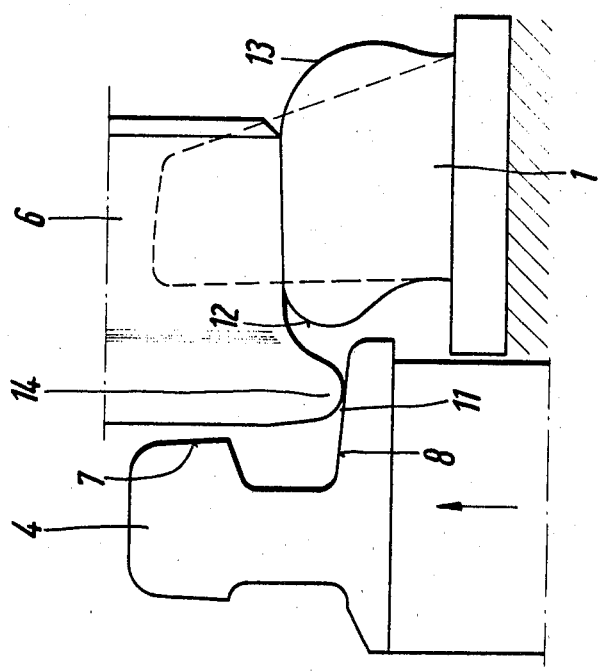
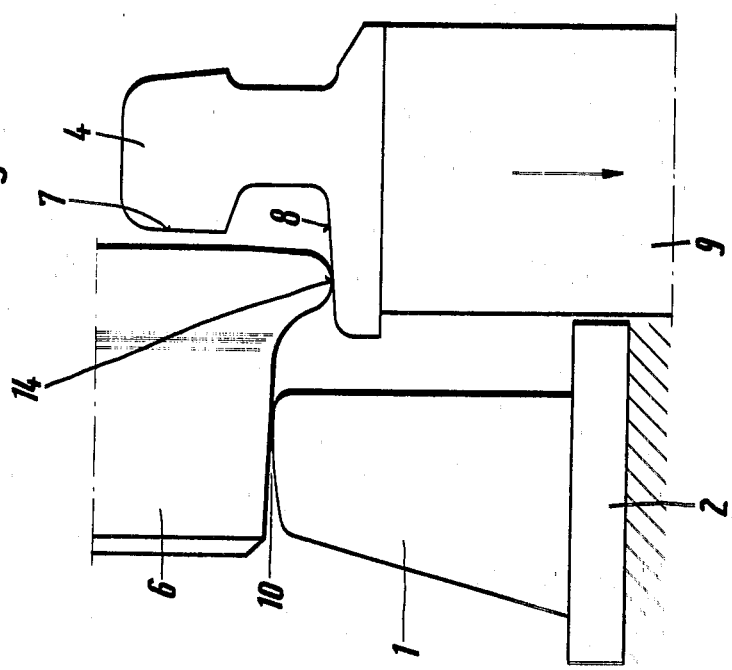

RUBBER TRACK BRAKE

BACKGROUND

The invention relates to a rubber track brake for the braking of free-rolling rail vehicles, which has rails made of rubber-elastic material laid on a longitudinal section in place of the normal rails of a track, and has guiding rails disposed alongside same, which have a contact surface for the flanges of the wheels of the oncoming cars.

In known rubber track brakes of this kind, the rubber rails are vertically displaceable, and the braking of the cars is performed with the rubber rails in the raised position. The contact surfaces of the wheels of an oncoming car roll onto the rubber rails and sink to a greater or lesser depth into the elastic rubber brake body, depending on the weight of the car. The energy of movement of the car is thus transformed partially into kneading work, and the car is retarded as it rolls over the rubber rails. But if the rubber track brakes are in the lower position, the braking action is withheld, and the flanges of the wheels roll on the guiding rails disposed alongside the rubber rails. It is characteristic of such brakes that, in the event of a failure of the hydraulic mechanism for the raising and lowering of the rubber rails the brake is disengaged, so that the cars roll through freely. In certain applications, this cannot be allowed, for reasons of safety.

SUMMARY

The present invention is therefore directed to a rubber track brake which, in the event of failure of the operating mechanism, is in the braking position, that is, one in which the position of rest is the braking position.

This is achieved according to the invention wherein rails of rubber-elastic material are fixed to a foundation and guiding rails alongside thereof are vertically displaceable and have a contact surface for the flanges of car wheels. Preferably, the guiding rails are provided with ramps at both ends.

THE DRAWING

The invention is explained by way of example hereinbelow, with reference to the drawing.

FIG. 1 shows a top plan view of an embodiment of the rubber track brake of the invention.

FIG. 2 is a side elevation of the rubber track brake of FIG. 1.

FIG. 3 is a cross section of the rubber track brake of FIG. 1 with an unbraked wheel.

FIG. 4 shows the rubber track brake of FIG. 3 in the braking position.

DESCRIPTION

The rubber track brake represented in the drawing has rails 1 of a rubber-elastic material, which are fastened to a solid foundation 2 and are laid on a longitudinal section in place of the normal rails 3 of a track. On the two inner sides of rails 1 are disposed parallel guiding rails 4 which have a ramp 5 at each end to assure a shock-free entry and departure of the cars on and off of the guiding rails 4. The guiding rails 4 are displaceable vertically by a reciprocating member 9 (FIGS. 3 and 4) which is raised and lowered by conventional means such as a hydraulic device and the like. In FIG. 2, both positions of the guiding rails 4 are represented, the guiding rail marked 4a being in the elevated position and the guiding rail marked 4b being in the lowered position. The relative position of rail 1 is shown in phantom in FIG. 2.

FIG. 3 shows in the raised position a guiding rail 4 which is provided with a lateral guiding surface 7. In this position the flange 14 of an oncoming wheel 6 rolls on the guiding surface 8 of the guiding rail 4, while a clearance 10 is created between the rolling surface of the rail 1 and the rolling surface of the wheel 6.

FIG. 4 shows the guiding rail 4 in the lowered position wherein a clearance 11 is formed between the flange 14 of the wheel 6 and the contact surface 8 of the guiding rails 4. The entire wheel load is taken by the rail 1, which forms lateral bulges 12 and 13 under stress. In the case of very heavy cars the rolling surface of the wheel 6 can sink so deeply into the rubber rail 1 that the flange 14 contacts the guiding surface 8 of the guiding rail 4. In this case a portion of the wheel load is supported by the guiding rail 4.

In the normal position shown in FIG. 4 the guiding rails are lowered and the rubber track brake is in the braking position. If the guiding rails are in this position, the rolling surfaces of the wheels of an oncoming car run on the rubber rails which receive the entire weight of the car. The wheels sink to a greater or lesser depth according to the car weight and are retarded by the kneading work in the rubber. To disengage the braking force, the guiding rail is raised to its upper position, thereby lifting the car which now rolls by the flange of its wheels on the rolling surface of the guiding rail, raising it to such an extent that the rolling surface of the wheels no longer contacts the surface of the rubber rail. The car then rolls unretarded and without resistance through the brake, the wheels rolling only on the guiding rails.

What is claimed is:

1. Rubber track brake for braking of rolling rail vehicles, which comprises rails of rubber-elastic material laid on a longitudinal section in place of normal rails, guiding rails disposed alongside said rubber-elastic rails having a contact surface for the flanges of car wheels, said rails of rubber-elastic material being fixed to a foundation and said guiding rails being vertically displaceable.

2. Track brake of claim 1 wherein said guiding rails are provided at both ends with ramps.

* * * * *